United States Patent
Golan et al.

(10) Patent No.: US 10,402,484 B2
(45) Date of Patent: Sep. 3, 2019

(54) ALIGNING ANNOTATION OF FIELDS OF DOCUMENTS

(75) Inventors: Shahar Golan, Haifa (IL); Omer Barkol, Haifa (IL); Ruth Bergman, Haifa (IL); Ira Cohen, Modiin (IL); Gal Noy, Yehud (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 826 days.

(21) Appl. No.: 14/354,115

(22) PCT Filed: Oct. 27, 2011

(86) PCT No.: PCT/US2011/058043
§ 371 (c)(1),
(2), (4) Date: Apr. 24, 2014

(87) PCT Pub. No.: WO2013/062550
PCT Pub. Date: May 2, 2013

(65) Prior Publication Data
US 2014/0281878 A1  Sep. 18, 2014

(51) Int. Cl.
G06F 17/00 (2006.01)
G06F 17/24 (2006.01)
G06F 17/30 (2006.01)

(52) U.S. Cl.
CPC ........ G06F 17/241 (2013.01); G06F 17/3071 (2013.01)

(58) Field of Classification Search
CPC .. G06F 17/241; G06F 17/242; G06F 17/2247; G06F 17/3071

(Continued)

(56) References Cited

U.S. PATENT DOCUMENTS 7,505,984 B1 * 3/2009 Nevill-Manning ........................ G06F 17/2211
7,836,012 B1 * 11/2010 Nevill-Manning ........................ G06F 17/2211
707/602

(Continued)

FOREIGN PATENT DOCUMENTS

WO WO-2008021561 A2 2/2008

OTHER PUBLICATIONS

International Search Report and Written Opinion of the International Searching Authority, dated Jul. 30, 2012, issued in related PCT Application No. PCT/US2011/058043.

(Continued)

*Primary Examiner* — Scott Baderman
*Assistant Examiner* — Jason Edwards (57) ABSTRACT

Methods and systems of aligning annotation of fields of documents are provided. Training information that includes first measurement information pertaining to features of each of a plurality of fields associated with training clusters for documents of a document type is accessed. A first training cluster is annotated with a first name and the second training cluster is annotated with a second name. An electronic classification model is generated based on the training information. Second measurement information for features of fields associated with new clusters of a new document is accessed. Each of the new clusters is automatically annotated based on the second measurement information using the classification model. For example, a first new cluster that has fields of the first field type is annotated with the first name and a second new cluster that has fields of the second field type is annotated with the second name.

20 Claims, 4 Drawing Sheets

(58) Field of Classification Search
USPC .......... 715/232; 706/52; 707/602, 776, 709, 707/737
See application file for complete search history.

(56) References Cited

U.S. PATENT DOCUMENTS

| | | | | |
|---|---|---|---|---|
| 8,374,975 | B1* | 2/2013 | Cierniak | G06F 17/241 |
| | | | | 706/12 |
| 8,589,366 | B1* | 11/2013 | Younes | G06F 17/30864 |
| | | | | 707/602 |
| 2002/0143659 | A1* | 10/2002 | Keezer | G06Q 30/0641 |
| | | | | 705/27.1 |
| 2004/0111400 | A1* | 6/2004 | Chevalier | G06F 17/3089 |
| 2004/0158799 | A1 | 8/2004 | Breuel | |
| 2004/0162833 | A1 | 8/2004 | Jones et al. | |
| 2007/0260612 | A1 | 11/2007 | Papakonstantinou | |
| 2009/0157572 | A1 | 6/2009 | Chidlovski | |
| 2009/0182759 | A1 | 7/2009 | Kirpal | |
| 2010/0198770 | A1* | 8/2010 | Sengamedu | G06N 99/005 |
| | | | | 706/52 |
| 2010/0257440 | A1* | 10/2010 | Kshirsagar | G06F 17/30896 |
| | | | | 715/230 |
| 2011/0029525 | A1* | 2/2011 | Knight | G06F 17/30713 |
| | | | | 707/737 |
| 2011/0191381 | A1 | 8/2011 | Zheng | |

OTHER PUBLICATIONS

Li, Z. et al.; "Web Data Extraction Based on Structural Similarity"; Feb. 2, 2005; 24 pages.

Davi de Castro Reis et al: "Automatic web news extraction using tree edit distance", May 17, 2004 (May 17, 2004), pp. 502-511, XP055192127.
Nilesh Calvi et al: "Automatic wrappers for large scale web extraction", Proceedings of the VLDB endowment, vol. 4, No. 4, Jan. 1, 2011 (Jan. 1, 2011), pp. 219-230, XP055191972.
Shuyi Zheng et al: "Efficient record-level wrapper induction", Proceeding of the 18th ACM conference on information and knowledge management, CIKM '09, Jan. 1, 2009 (Jan. 1, 2009), p. 47, XP055191934.
Arlotta et al., Automatic Annotation of Data Extracted from Large Web Sites, International Workshop on the Web and Databases (WebDB), Jun. 2003 (6 pages).
Jan et al., Data Clustering: A Review, ACM Computing Surveys, vol. 31, No. 3, Sep. 1999 (60 pages).
Koontz et al., Abstract, A Graph-Theoretic Approach to Nonparametric Cluster Analysis, Aug. 2006 (2 pages).
Luo et al., HP Laboratories, Web Article Extraction for Web Printing: A DOM+Visual based Approach, Aug. 2009 (5 pages).
Omer et al., A New Frequent Similar Tree Algorithm Motivated by DOM Mining Using RTDM and its new variant—SiSTeR, HP Laboratories, Jun. 2012 (7 pages).
Peter Willett, Recent Trends in Hierarchic Document Clustering: A Critical Review, Information Processing & Management, vol. 24, No. 5, 1988 (21 pages).
Res et al., Automatic Web News Extraction Using Tree Edit Distance, May 2004 (10 pages).
Wang et al., Instance-based Schema Matching for Web Databases by Domain-specific Query Probing, Proceedings of the 30th VLDB Conference, 2004 (12 pages).

* cited by examiner

ALIGNING ANNOTATION OF FIELDS OF DOCUMENTS

CROSS-REFERENCE TO RELATED APPLICATION

This application is a national stage application under 35 U.S.C. § 371 of PCT/US2011/058043, filed Oct. 27, 2011.

BACKGROUND

There have been various types of technologies, automated or manual, for annotating information in a document with appropriate names. For example, there are automatic technologies that locate information from a single site, analyze and annotate the located information from the single site. Then the whole process is repeated again for a second web site. However, these automated technologies result in different names being used for the same type of fields because, they use hints in the web site to determine the names. For example, one web site may refer to one type of field as a user, another web site may refer to the same type of field as an author, and a third web site may refer to the same type of field as a poster. In another example, one web site may refer to a field as a title and another web site may refer to the same type of field as a subject.

There are also technologies that rely on manual processes. For example, a person may manually look at a web site and find a link to the author's web page and another link to the author's name.

BRIEF DESCRIPTION OF THE DRAWINGS

FIG. 1 depicts a system for aligning the annotation of fields of documents, according to one embodiment.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "detecting," "determining," "operating," "using," "accessing," "comparing," "associating," "deleting," "adding," "updating," "receiving," "transmitting," "inputting," "outputting," "creating," "obtaining," "executing," "storing," "generating," "annotating," "extracting," "causing," "transforming data," "modifying data to transform the state of a computer system," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview

A method and a system for aligning the annotation of fields of documents are provided, according to various embodiments. For example, a plurality of documents that belong to the same type of document are used to generate an electronic classification model based on training information obtained by analyzing the documents. Examples of document types include news, games, invoices and information technology. In this case, documents for CNN, BBC and New York times are examples of documents that are of the same type since they are all news type documents As discussed herein, pages may have names associated with fields. As depicted in Table 1 below.

|  | First training web page | Second training web page | Third training web page | Fourth training web page |
| --- | --- | --- | --- | --- |
| First field type | User | Author | poster |  |
| Second field type | Subject | Title | title |  |
| Third field type | Message | Body | post |  |

For example referring to Table 1, a first web page may refer to a first type of field as a title and second web page may refer to the same type of field as a subject. Therefore, the first type of field shall be referred to as a "title/subject" type field. In another example, a first web page may refer to a second type of field as a message, second web page may refer to the second type of field as a body, and a third web page may refer to the second type of field as a post. Therefore, this second type of field shall be referred to as a "message/body/post" type of field. In yet another example, a first web page may refer to a third type of field as a user, a second web page may refer to the third type of field as an author, and a third web page may refer to the third type of field as a poster. Therefore, this third type of field shall be referred to as a "user/author/poster" type of field. In still another example, a fourth web page may include any one or more of the "message/body/post," "title/subject," and "user/author/poster" types of fields but may not include any hints for names of those fields.

The fields associated with a training set of documents are assigned to clusters, according to various embodiments, so that each cluster is for a type of field. For example, there may be a first training cluster for user/author/poster type fields, second training cluster for title/subject type fields, and third training cluster for message/body/post type fields. The clusters can then be annotated according to their field type by a human. For example, the human may annotate the first training cluster with "author," the second training cluster with "title," and the third training cluster with "message."

The features for each of the fields associated with the training clusters can be measured. The measurements of the features of the fields for each of the clusters are also referred to as "training information." A learning based classifier, according to one embodiment, receives the training information and generates an electronic classification model based on the training information.

The fields of a new web page can be annotated, for example, by assigning the fields of the new web page to clusters (also referred to herein as "new clusters"), measuring features of the fields for each of the new clusters, and using the classification model to annotate the new clusters based on the feature measurement information of the fields for each of the new clusters. For example, assume that the new web page has fields that the new web page refers to respectively as user, subject, and body. The feature measurements of the fields for each of the new clusters can be compared to the feature measurements of the fields for each of the training clusters to align the annotation of the new clusters with that of the training clusters. More specifically, the new clusters for the new web page can be annotated author, title, and message instead of user, subject and body.

Although the training web pages and the new web pages may include names of fields or hints pertaining to the names of the fields, various embodiments do not use or require the field names or the hints. Continuing the example, although the new web page may include hints or names of fields indicating that the fields are for a user, a subject, and a title, various embodiments do not use or require field names or hints associated with the new web page but instead cluster the new web page's fields based on similarity measurements, classify the new web page's fields and annotate the new web page's fields based on the field names that the human assigned to the training web pages' fields, as will become more evident.

Although many embodiments will be described in the context of documents that are web pages, various embodiments can be used in the context of many different types of documents, such as paper documents, word documents or web pages. According to one embodiment, the documents that are annotated are not required to have the same format. For example, user/author/poster type fields in two different documents may be located in different places on respective documents, among other things. Further, the documents may be from different sources.

System

Figure 1:
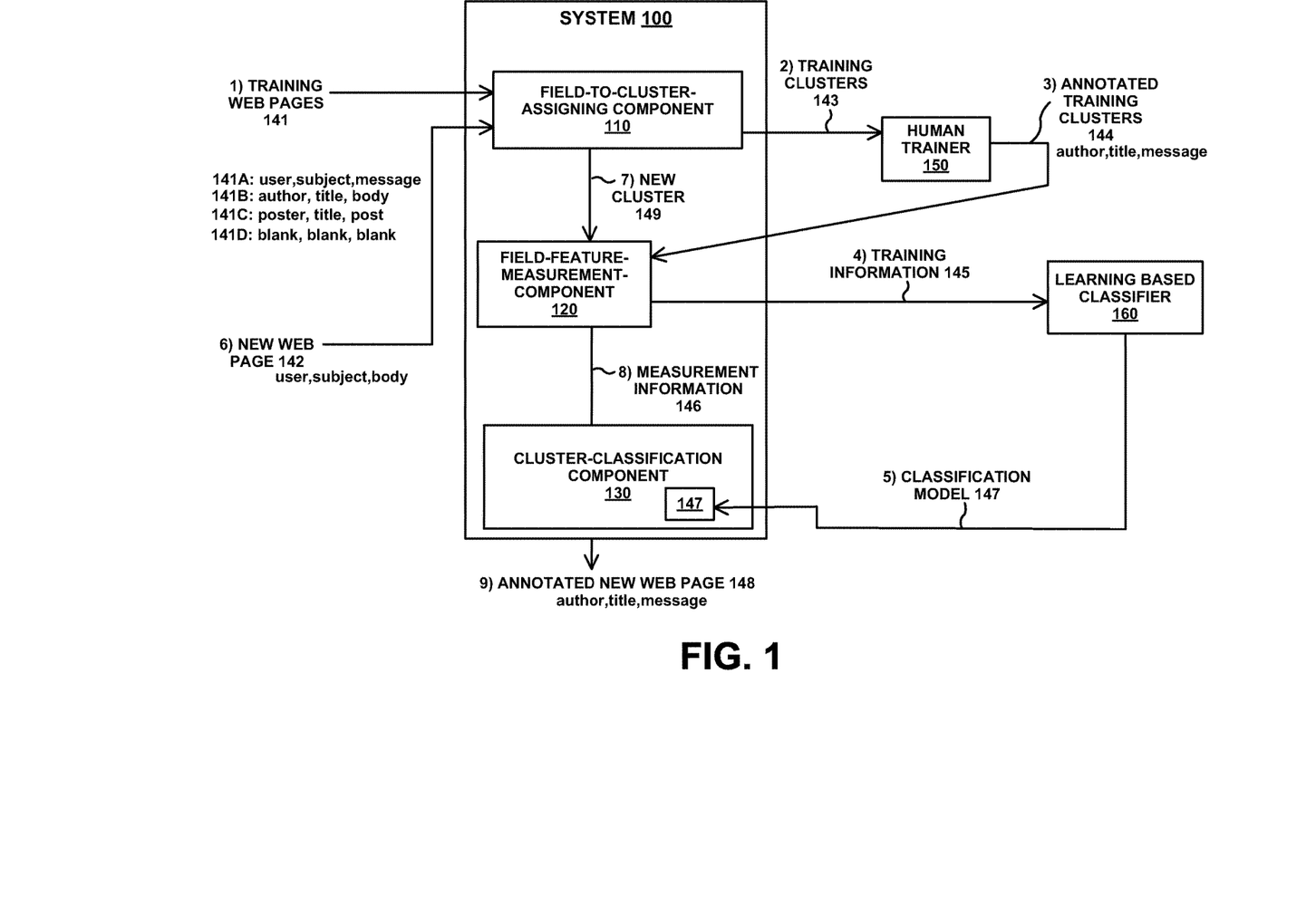
FIG. 1 depicts historical event data that was generated by a plurality of users associated with an organization over a period of time, according to one embodiment.

FIG. 1 depicts a system 100 for aligning the annotation of fields of documents, according to one embodiment. The blocks that represent features in FIG. 1 can be arranged differently than as illustrated, and can implement additional or fewer features than what are described herein. Further, the features represented by the blocks in FIG. 1 can be combined in various ways. The system 100 can be implemented using hardware, hardware and software, hardware and firmware, or a combination thereof.

For the purposes of illustrating the system 100, the documents are web pages. However, various embodiments are well suited to other types of documents, such as paper documents, word documents, among other things.

The system 100 includes a field-to-cluster-assigning-component 110, a field-feature-measurement-component 120, and a cluster-classification-component 130.

At 1, the field-to-cluster-assigning-component 110 receives training web pages 141 that are of the same type of document. As depicted in FIG. 1, there are four training web pages 141A, 141B, 141C, 141D. For the sake of simplicity, various embodiments will be described in the context of four training web pages 141A-141D. In actual practice, a larger number of web pages from each web site may be used. For example, there may be approximately 100 web pages from 5 or more web sites. Each of the training web pages 141A-141D include three types of fields that include hints pertaining to those field names as depicted in Table 2 below.

|  | Training web page 141A | Training web page 141B | Training web page 141C | Training web page 141D |
| --- | --- | --- | --- | --- |
| First field type | User | Author | poster |  |
| Second field type | Subject | Title | title |  |
| Third field type | Message | Body | post |  |

Although the four training web pages 141A-D have fields of the same types, the training web pages 141A-D include different hints for the fields of the same type. For example, assume that training web pages 141A-141C refer respectively to the first field type as user, author, and poster. In another example, training web pages 141A-141C refer respectively to the second field type as subject, title, and title. In yet another example, training web pages 141A-141C refer respectively to the third field type as message, body, and post. The fields for the three field types associated with training web page 141D are blank because training web page 141D does not include hints or names of the fields.

The field-to-cluster-assigning-component 110 generates training clusters 143 as discussed herein. For example, according to one embodiment, fields from the training web pages 141A-141D for the first type are associated with a first training cluster, the fields from the web pages 141A-141D for the second type are associated with a second training cluster, and the fields from the web pages 141A-141D for the third field type are associated with a third training cluster.

At 2, a human trainer 150, according to one embodiment, receives training clusters 143 and, annotates the training clusters 143 resulting in annotated training clusters 144. For the purpose of illustration assume that the human trainer 150 annotated the first training cluster as author, the second training cluster as title, and the third training cluster as messenger.

At 3, the field-feature-measurement-component 120 receives the annotated training clusters 144 and generates and outputs training information 145.

At 4, the learning based classifier 160 receives the training information and generates an electronic classification model 147. An example of a learning based classifier 160 is Wake Up.

At 5, cluster-classification-component 130 receives and is configured with the classification model 147. At this point, the system 100 is configured to automatically annotate new web pages 142, according to one embodiment, and, therefore, does not require manual intervention on the part of a human.

At 6, the field-to-cluster-assigning-component 110 receives a new web page 142. Assume for the purpose of illustration that the new web page 142 included hints that the first field type is "user," the second field type is "subject," and the third field type is "body." The field-to-cluster-assigning-component 110 generates new clusters 149 for the new web page 142, according to various embodiments, as discussed herein.

At 7, the field-feature-measurement-component 120 receives the new clusters 149, analyzes the fields associated with the new clusters 149 to determine measurement information 146 associated with the fields of the new web page 142. As discussed herein, the measurement information 146 may be per field or per page, among other things.

At 8, the cluster-classification-component 130 receives the measurement information 146 for the new web page 142 and uses the measurement information 146 to annotate the new web page 142 resulting in an annotated new web page 148 at 9 that are aligned with the training web pages 141. For example, the annotated new web page is annotated with the same names "author," "title," and "message" as the annotated training clusters 144.

Although FIG. 1 depicts the training clusters 143 being annotated before being classified, the training clusters 143 can be classified before being annotated.

According to one embodiment, the training documents and the new documents, such as training web pages 141 and new web pages 142, are unstructured or semi-structured. A structured document, according to one embodiment, is a document where all of the fields have names, such as "author," "date," "body," and so on. According to various embodiments, the names of fields specified by the documents are not used or are not required. For example, various embodiments group fields in clusters, for example, based on similarity measurements and then classify the clusters, as discussed herein, instead of using names of fields specified or hinted by the documents themselves. Further, various embodiments are well suited to either a training web page 141 or a new web page 142 that does not specify or hint at names for fields, as will become more evident.

For example, training web page 141D has blanks associated with the field types, according to one embodiment. Further, various embodiments are well suited for annotating a new web page 142 that does not have names of fields or hints for the fields. For example, even if there were no hints or field names associated with the new web page 142 indicating that the respective fields are named user, subject, body, as depicted in FIG. 1, various embodiments are well suited to annotating the respective fields of the new web page 142 based on the field names "author," "title," and "message," for example by clustering, classifying, and annotating, according to various embodiments.

The system 100 may also include an information extraction component for extracting information from web pages 142 associated with names that the system 100 annotated the web pages 142 with.

According to one embodiment, the documents may come from different sources. For example, two or more of the web pages 141, 142 may come from different sources. According to one embodiment, the source of the web pages 141, 142 is not used, not known, or not required.

Clustering

As discussed herein, fields of training web pages 141 and new web pages 142 are grouped in clusters, according to one embodiment. According to one embodiment, fields are assigned to a cluster based on a similarity measurement. A similarity measurement may be based on similarities in edit distance or similarities in measurements of features, among other things.

According to one embodiment, the Domain Object Model (DOM) can be used as a part of obtaining edit distance between fields. A DOM is a hierarchical structure, also referred to as a "tree," that represents a web page. Each DOM has a single root and subtrees where each of the subtrees represents a field of the web page, which the DOM represents. The subtrees can be analyzed for similarities to locate similar fields.

Figure 2:
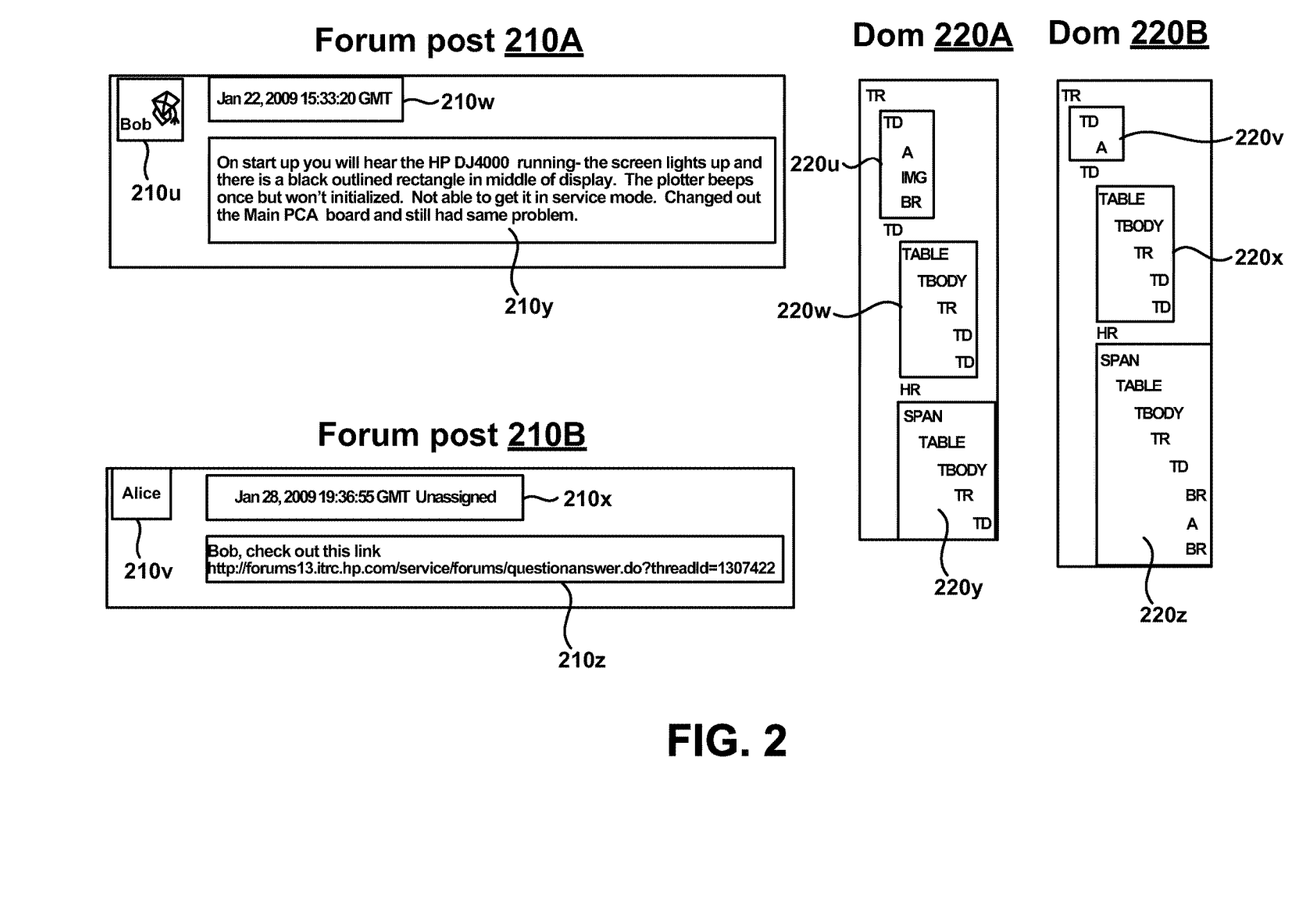
FIG. 2 depicts forum posts for a web site and associated DOMs, according to one embodiment.

FIG. 2 depicts forum posts for a web site and associated DOMs, according to one embodiment. As depicted in FIG. 2, the forum posts 210A, 210B are for two web pages of the same web site where each forum post 210A, 210B has an associated DOM 220A, 220B. The forum post 210A has a DOM 220A and the forum post 210B has a DOM 220B. The DOMs 220A, 220B both have roots represented by the TR label that are located at the top of the respective DOMs 220A, 220B. Both forum posts 210A, 210B respectively include three types of fields, which continuing the illustration are user/author/poster type fields for fields 210U, 210V, date/time stamp type fields for fields 210W, 210X, and message/body/post type fields for fields 210Y, 210Z.

The respective DOMs 220A, 220B each have three subtrees that represent the three field types. For example, subtrees 220U and 220V respectively represent the fields 210U, 210V, the subtrees 220W and 220X respectively represent the fields 210W, 210X, and the subtrees 220Y, 220Z respectively represent the fields 210Y. 210Z.

According to one embodiment, the edit distance is the minimum number of edit operations that are used to transform one subtree into another subtree. Rules for determining the edit distance can be used depending on the application. For example, according to one embodiment, the allowed types of edit operations include adding a tag, deleting a tag, replacing a tag, without changing the root of a tree. For example, in order to transform subtree 220U into subtree 220V, two edit operations could be used to delete the IMG and the BR tags. Therefore, according to one embodiment, the edit distance between subtrees 220U and 220V is two. In another example, subtrees 220W and 220X are identical. Therefore, the edit distance between subtrees 220W and 220X is zero.

According to one embodiment, a very large edit distance is used when two subtrees are entirely different. For example, subtree 220U is entirely different than subtree 220Z, according to one embodiment. Therefore, the edit distance between them is very large, according to one embodiment.

According to one embodiment, all pairs of subtrees are compared. For example, every node can be treated as a "root" of its own subtree. As depicted in FIG. 2, DOM 220A includes approximately 17 subtrees and represents 3 fields. The subtrees are compared, according to one embodiment. After tree-clusters are found, each cluster member can be treated as a field, according to one embodiment.

For the purposes of illustration, assume that the fields 210U and 210V would be assigned to a first cluster, the fields 210W and 210X would be assigned to a second cluster and the fields 210Y and 210Z would be assigned to a third cluster.

Although the DOM may be used, according to one embodiment, as a part of grouping fields into clusters, after the fields have been grouped into clusters, the DOM is not used or required, according to one embodiment. For example, according to one embodiment, the DOM is not used or required for classification, for annotation or for extraction, as described herein.

Other methods of determining similarity measurements between fields can also be used for the purpose of assigning fields to clusters. For example, features of fields can be measured to determine similarities between fields. Feature measurements for fields may be on a per field basis or on a per page basis. Examples of feature measurements per field include a field's length, a field's vertical location, a field's horizontal location, a field's area, a field's font size, a field's hash value, a field's element type, such as image or date, among others, and the page number where the field is located. Examples of feature measurements per page include average value, minimum value, maximal value, entropy, number of distinct values, and percentage of distinct values. Other examples of features include the visual structure of a field and the values of the fields. For example, it may be apparent that the value is an amount, a date or an address, among other things.

According to one embodiment, a threshold is used as a part of assigning fields to clusters. For example, the threshold may be a number of edit operations that are used to transform one subtree into another subtree. If the edit distance between the two subtrees is below the threshold, then the fields for the respective subtrees are assigned to the same cluster. In another example, the threshold may be a measurement of how similar the feature measurement for one field is to the feature measurement of another field.

According to one embodiment, the same threshold is used for all fields for all clusters for a web site type. For example, the same threshold can be used for the web sites that are related to news and another threshold can be used for web sites that are related to games. However, the same threshold may be used for the news related web sites and the game related web sites.

According to one embodiment, an empirical method is used as a part of determining a threshold. For example, a human trainer 150 can determine the training clusters 143 associated with training web pages 141. Since the human trainer 150 determined the clusters 143, it can be assumed that the clusters 143 have been determined accurately. Then the training web pages 141 can be inputted to the automated clustering process, such as system 100, using a threshold to see how the automated clustering process assigns clusters based on that threshold. If the automated clustering process assigns similar fields to different clusters than the human trainer 150 determined, then the threshold can be adjusted and the automated process can be performed again on the training web pages 141. The process can be performed iteratively with different thresholds until the clusters determined by the automated clustering process are the same or nearly the same as those determined by the human trainer 150.

Generating Clusters for Training

According to one embodiment, a classification model 147 is generated based on training information 145. According to one embodiment, the training information 145 includes measurements of features of fields on a per cluster per web page basis. For example, the training web pages 141 may include 5 web sites with approximately 100 web pages per web site.

The fields associated with the training web pages 142 can be assigned to training clusters 143, automatically, according to various embodiments, so that each training cluster 143 includes the fields of one type. More specifically, assume that there are four training web pages 141A-141D depicted in FIG. 1 with three types of fields as depicted in Table 2.

Although the four training web pages 141A-D have fields of the same types, the training web pages 141A-D include different hints for the fields of the same type. For example, assume that training web pages 141A-141C refer respectively to the first field type as user, author, and poster. In another example, training web pages 141A-141C refer respectively to the second field type as subject, title, and title. In yet another example, training web pages 141A-141C refer respectively to the third field type as message, body, and post. The fields for the three field types associated with training web page 141D are blank because training web page 141D does not include hints or names of the fields. According to one embodiment, fields from the training web pages 141A-141D for the first type are associated with a first training cluster, the fields from the web pages 141A-141D for the second type are associated with a second training cluster, and the fields from the web pages 141A-141D for the third field type are associated with a third training cluster.

Annotating Training Clusters

According to one embodiment, a human trainer 150 can assign (also known as "annotating") a name to each of the training clusters 143. For example, the human trainer 150 may decide to assign "author" to the first training cluster, "title" to the second training cluster, and "message" to the third training cluster, thus, aligning the annotation of the fields for the four training web pages 141A-141D.

According to one embodiment, annotating the training information is not manually intense. For example, a human trainer 150 can associate a name with a cluster and that name can then be automatically associated with each field associated with the cluster. This greatly reduces the amount of manual work that a human trainer 150 would perform.

Measurements of Features for Training Clusters

Measurements for features of each of the fields in the training clusters 143, according to one embodiment, are determined resulting in training information 145. The features can be measured per field or per web page. Examples of feature measurements for fields include a field's length, a field's vertical location, a field's horizontal location, a field's area, a field's font size, among other things. Examples of feature measurements average values, minimum values, maximum values, among other things.

Figure 3:
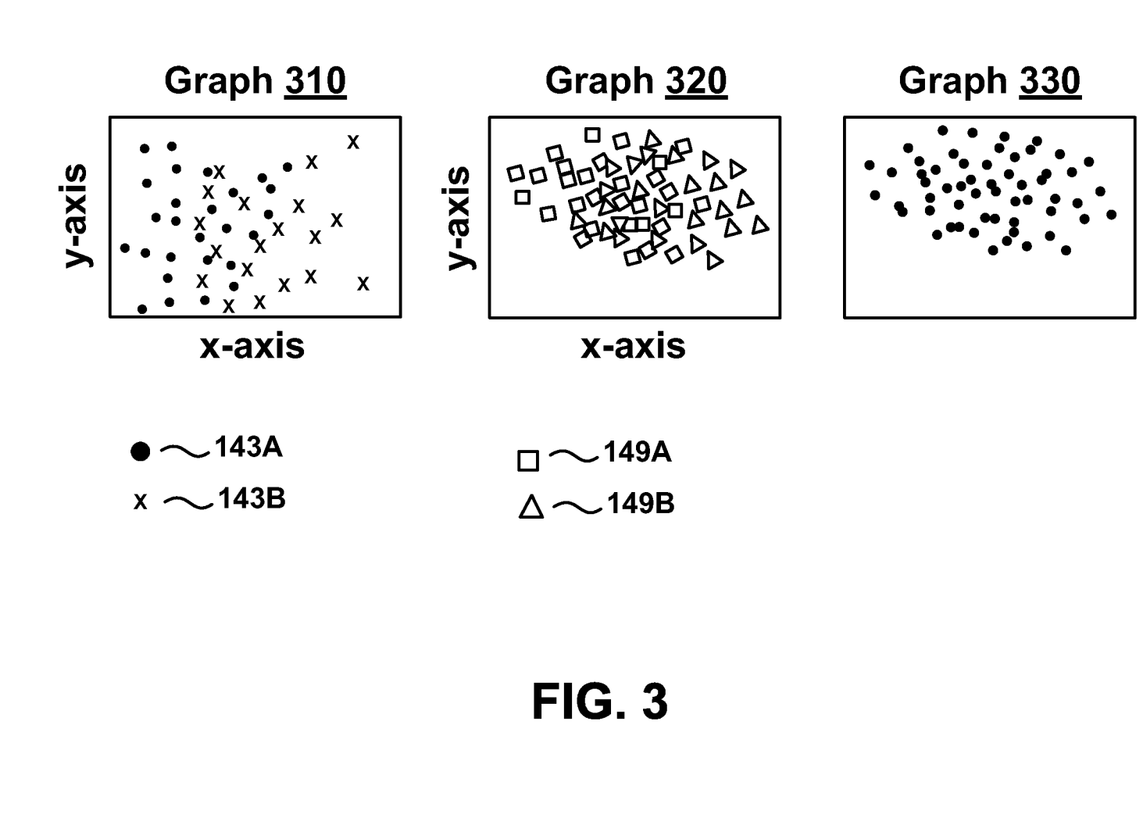
FIG. 3 depicts three graphs, according to various embodiments.

FIG. 3 depicts three graphs, according to various embodiments. They are a graph 310 of measurements for features of fields associated with training clusters 143, a graph 320 of measurements for features of fields associated with new clusters 149, according to various embodiments (also referred to as "cluster based classification"), and a graph 330 of the same fields in graph 320 without clustering (also referred to as "element based classification").

Graph 310 depicts measurements of features for training clusters 143, according to one embodiment. As depicted in graph 310, each mark represents a field. Each mark is associated with a type of mark. As depicted on Figure C, there are two types of marks, circles and crosses. Therefore, each mark is either circle or cross. The types of marks represent the cluster 143A, 143B and the associated field type that the mark is associated with.

For the sake of simplicity, as depicted in Graph 310, there are two axis, an x-axis and a y-axis, because the training information 145 will include two measurements per field.

However, embodiments are well suited for measuring as many features for each of the fields as would be suitable in order to generate a classification model 147 for the purpose of classifying clusters, according to various embodiments.

The training clusters 143A and 143B, according to one embodiment, are annotated by a human trainer 150 resulting in annotated training clusters 144. For the sake of illustration, assume that the training cluster 143A represented by the circle is annotated as "title," and the training cluster 143B represented by the cross is annotated as "author."

Classification Model

Referring to FIG. 1, according to one embodiment, a learning based classifier 160 receives the training information 145 and generates a classification model 147. Examples of a learning based classifier 160 include Wake Up, among others. The classification model 147 is generated, according to one embodiment, based on the training information 145 that includes the measurements pertaining to features of each field associated with the training clusters 143 of the training web pages 141. Therefore, the classification model 147, according to one embodiment, has information pertaining to the training clusters 143, the names that annotate each of the training clusters 143, and the feature measurements for each of the training clusters 143, among other things.

Generating New Clusters

By configuring the cluster-classification-component 130 with the classification model 147, the system 100 is ready to receive new web pages 142, to automatically generate new clusters 149 for the new web pages, automatically classify those new clusters 149, and automatically annotate the new web page 142. As discussed herein, various embodiments using similarity measurements, such as edit distance or similarities in feature measurements can be used.

According to one embodiment, a cluster is obtained by examining web pages from the same web site. However, embodiments are also well suited for generating a cluster for web pages from more than web site.

Classifying New Clusters

The classification model 147, which has been configured with the classification model 147, can be used to classify the new clusters 149 associated with new web pages 142.

Prior to classification, the field types are not known, according to one embodiment. However, according to one embodiment, it is known prior to classification that each of the new clusters 149 represents a different type of field, according to one embodiment. The field type associated with each of the new clusters 149 can be determined using classification, according to one embodiment.

More specifically, features of the fields of the new clusters 149 for the new web page 142 can be measured, as described herein, resulting in measurement information 146. The measurement information 146 for the fields of the new clusters 149 of the new web page 142 can be received by the classification model 147. For example, the measurement information 146, which includes feature measurements of the fields for each of the new clusters 149, can be compared to the feature measurements of the fields for each of the annotated training clusters 144 to determine how the new clusters 149 correlate with the training clusters 143.

FIG. 3 depicts a graph 320 of measurements of features for new clusters 149A, 149B, according to one embodiment. Each mark represents a field and is associated with a type of mark. As depicted on graph 320, there are two types of marks, squares and triangles. Therefore, each mark is either a square or a triangle. The types of marks represent the cluster 149A, 149B and the associated field type that the mark is associated with.

For the sake of simplicity, as depicted in graph 320, there are two axis, an x-axis and a y-axis, because the measurement information 146 for the new web page 142 will include two measurements per field. However, embodiments are well suited for measuring as many features for each of the fields as would be suitable for the purpose of classifying the new clusters 149, according to various embodiments.

As depicted in graph 320, some marks of different types are close together. For example, some of the squares and triangles are close together. This indicates, according to one embodiment, that it can be difficult to determine the classification for each individual field solely based on each individual field's features (also referred to herein as "element-based classification"). Graph 330 depicts marks that represent the same fields that are depicted in graph 320 except that all of the marks in graph 330 are all dots illustrating the difficulty involved in classifying fields solely based on each individual field's features.

However, according to one embodiment, the fields were clustered prior to being classified. Therefore, according to one embodiment, the two new clusters 149A. 149B are each associated with a different type of fields. It is easier to classify clusters of fields where each cluster includes one type of field than to classify individual fields, according to one embodiment. For example, although some squares and triangles are close together, as depicted in graph 320, the square marks are further to the left and the triangle marks are further to the right. This pattern can be compared to the pattern associated with graph 310, which is associated with the training information 145. Therefore, after the new clusters 149A, 149B have been classified, it is known, according to one embodiment, that the square new cluster 149A correlates to the circle training cluster 143A because they are both oriented more toward the left and the triangle new cluster 149B correlates to the cross training cluster 143B because they are both oriented more toward the right.

The classification of clusters, as illustrated in graph 320, is also referred to as "cluster-based classification."

Automatically Annotating

After it has been determined how new clusters 149 correspond to the training clusters 145 using classification, the new clusters 149 can be annotated based on the names associated with the annotated training clusters 144, according to one embodiment. New web pages 142 are automatically annotated with names that are aligned with the names of the training clusters 143, according to one embodiment. For example, assume that a new web page 142 has fields where the new web page 142 refers to the respective field types as user, subject, and body, as depicted in FIG. 1. The fields of the new web page 142 can be clustered automatically, according to various embodiments. Continuing the example, assuming that the annotated training cluster 144 were annotated with author, title and message and the original new web page 142 included information indicating that its field types were named user, subject and body, the new clusters 149 for the new web page 142 can be annotated with author, title, and message instead of user, subject and body.

Referring to FIG. 3, as discussed herein, both the square new cluster 149A and the circle training cluster 143A are oriented more toward the left and both the triangle new cluster 149B and the cross training cluster 143B are oriented more toward the right. This pattern can be used to automatically annotate the square new cluster 149A and the triangle new cluster 149B. For example, the circle training cluster 143A was annotated "title," and the cross training cluster 143B was annotated "author." Therefore, according to one embodiment, the square new cluster 149A will be annotated "title," and the triangle new cluster 149B will be annotated "author," thus, aligning the annotation of the new clusters 149A, 149B with the training clusters 143A, 143B.

As can be seen, if an additional new web page 142 is received, the additional new web page 142's annotations will also be aligned with the annotation of the training clusters 143 and previously annotated new web pages 142.

The aligned names can be used to extract information from the new web pages 142, according to one embodiment. For example, assume that a previously annotated new web page 142 and the most recently annotated new web page 142 both have clusters for the field type title/subject and author/user/person that have been automatically annotated, according to various embodiments, respectively as "title" and "author." The fields annotated as "title" for both the previously annotated new web page 142 and the most recently annotated new web page 142 can be extracted and grouped together. Similarly, the fields annotated as "author" for both the previously annotated new web page 142 and the most recently annotated new web page 142 can be extracted and grouped together.

Method

Figure 4:
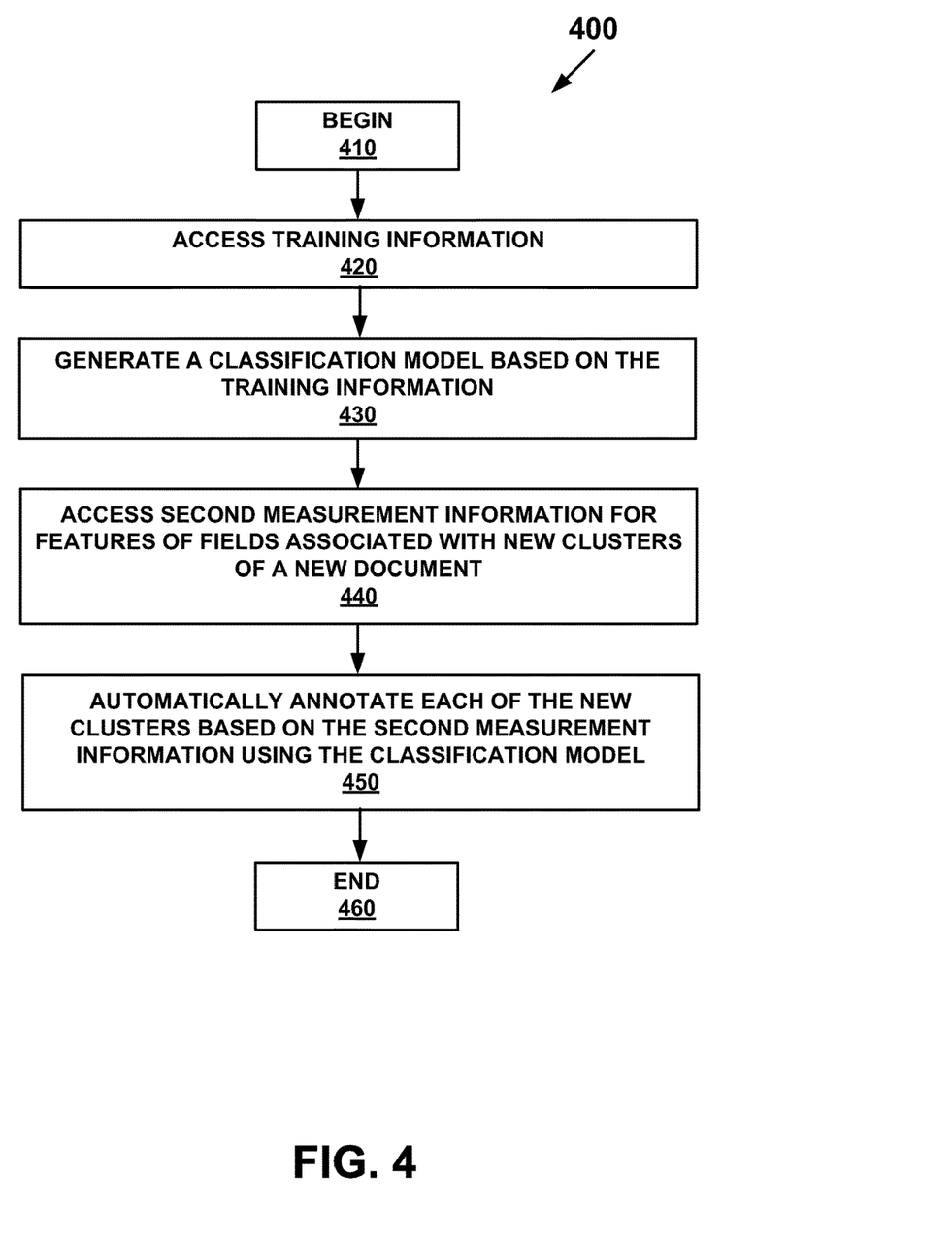
FIG. 4 depicts a flow chart of a method of aligning annotation of fields of documents, according to one embodiment.

FIG. 4 depicts a flow chart of a method of aligning annotation of fields of documents, according to one embodiment. Although specific operations are disclosed in flowchart 400, such operations are exemplary. That is, embodiments of the present invention are well suited to performing various other operations or variations of the operations recited in flowchart 400. It is appreciated that the operations in flowchart 400 may be performed in an order different than presented, and that not all of the operations in flowchart 400 may be performed.

The above illustration is only provided by way of example and not by way of limitation. There are other ways of performing the method described by flowchart 400.

At 410, the method begins.

At 420, training information is accessed. For example, the field-feature-measurement-component 120 outputs the training information 145 that can be accessed by the learning based classifier 160.

The training information 145 that includes first measurement information pertaining to features of each of a plurality of fields associated with training clusters 143 for documents 141 of a document type. A first training cluster 143 is annotated with a first name selected by a human trainer 150 because the first training cluster 143's fields are associated with a first field type and the second training cluster 143 is annotated with a second name selected by the human trainer 150 because the second training cluster 143's fields are associated with a second field type.

At 430, a classification model is generated based on the training information. For example, the learning based classifier 160 generates a classification model 147, which at 5, is received by the cluster-classification-component 130. The cluster-classification-component 130 is configured with the classification model 147. At this point, the system 100 is configured to automatically annotate new web pages 142 according to one embodiment, and, therefore, does not require manual intervention on the part of any humans.

At 440, second measurement information for features of fields associated with new clusters of a new document is accessed. For example, the field-to-cluster-assigning-component 110 receives a new web page 142. The field-to-cluster-assigning-component 110 generates new clusters 149 for the new web page 142, according to various embodiments, as discussed herein. The field-feature-measurement-component 120 receives the new clusters 149, analyzes the fields associated with the new clusters 149 to determine second measurement information 146 associated with the fields of the new web page 142. As discussed herein, the second measurement information 146 may be per field or per page, among other things. At 8, the cluster-classification-component 130 receives the second measurement information 146 for the new web page 142.

At 450, each of the new clusters 149 is automatically annotated based on the second measurement information 146 using the classification model 147. As discussed herein, the classification model 147 was generated based on the training information 145 that includes the measurements pertaining to features of each field associated with the training clusters 143 of the training web pages 141. Therefore, the classification model 147 associated with the cluster-classification component 130, according to one embodiment, has information pertaining to the training clusters 143, the names associated with each of the training clusters 143 due to annotation by the human trainer 150, and the feature measurements for each of the training clusters 143 from training web pages 141.

The cluster-classification-component 130, according to one embodiment, uses the second measurement information 146 to annotate the new clusters 149 resulting in an annotated new web page 148. Continuing the example, a first new cluster 149 that has fields of the first field type is annotated with the first name and a second new cluster 149 that has fields of the second field type is annotated with the second name.

At 460, the method ends.

By generating annotated new web pages 148, various embodiments provide for transforming data and for modifying data, such as the web page 142, thus, transforming the state of the computer system 100.

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present invention. According to one embodiment, the non-transitory computer readable storage medium is tangible.

CONCLUSION

According to various embodiments, field names or hints of field names are not used or not required in order to annotate web pages.

According to one embodiment, the documents that are annotated are not required to have the same format. For example, referring to FIG. 2, fields 210U and 210V have different formats as indicated by the differences in the corresponding subtrees 220U and 220V. In another example, the features of a news related web page and the features of a news related paper document can be compared to determine clusters for these two documents.

Further, the documents may be from different sources. For example, a CNN web site and a BBC web site are associated with different sources. In another example, a paper New York Times and a CNN web site are from different sources.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment." "one embodiment," among others, used herein, are not necessarily referring to the same embodiment. Features, structures, or characteristics of any embodiment may be combined in any suitable manner with one or more other features, structures, or characteristics.

What is claimed is:

1. A method comprising:
  accessing training information that includes first measurement information pertaining to features of a plurality of fields associated with training clusters for documents of a document type, the training clusters produced from clustering the plurality of fields in the documents into respective different training clusters for respective different field types, wherein a first training cluster associated with a first field type of the different field types is annotated with a first name and comprises fields of the first field type from the documents, and a second training cluster associated with a second field type of the different field types is annotated with a second name and comprises fields of the second field type from the documents;
  generating an electronic classification model based on the training information;
  accessing second measurement information for features of fields associated with new clusters of a new document; and
  automatically annotating, performed by a computer system, each of the new clusters based on the second measurement information using the classification model, wherein a first new cluster that has fields of the first field type is annotated with the first name, and a second new cluster that has fields of the second field type is annotated with the second name.

2. The method of claim 1, further comprising:
  generating the new clusters based on similarity measurements between the fields associated with the new document, wherein the second new cluster does not include the fields of the first field type that are included in the first new cluster.

3. The method of claim 2, wherein the generating of the new clusters comprises:
  generating the new clusters based on a hierarchical tree structure that represents the new document that includes a subtree for each of the fields associated with the new document.

4. The method of claim 2, wherein the generating of the new clusters comprises:
  generating the new clusters based on measurements of features for the fields associated with the new document, the measurements of features derived based on at least one selected from a length of a feature, a location of a field, a font size of a field, and an area of a field.

5. The method of claim 1, further comprising:
  accessing third measurement information for features of fields associated with additional new clusters of an additional new document; and
  automatically annotating, performed by the computer system, each of the additional new clusters based on the third measurement information using the classification model, wherein a first additional new cluster that has fields of the first field type is annotated with the first name, and a second additional new cluster that has fields of the second field type is annotated with the second name.

6. The method of claim 1, further comprising:
  receiving similarity measurements between features of the plurality of fields in the documents of the document type; and
  using the similarity measurement between features of a first field of the plurality of fields and of a second field of the plurality of fields to determine whether the first and second fields are to be assigned to one of the training clusters.

7. The method of claim 6, wherein the similarity measurement between the features of the first and second fields comprises an edit distance between the features of the first and second fields, wherein the edit distance is a minimum number of edit operations used to transform a subtree corresponding to the first field to a subtree corresponding to the second subfield, and wherein using the similarity measurement between features of the first and second fields to determine whether the first and second fields are to be assigned to one of the training clusters comprises comparing the similarity measurement to a threshold.

8. The method of claim 1, further comprising:
  receiving measurements of features of the plurality of fields in the documents of the document type; and
  using the measurements of features of a first field of the plurality of fields and of a second field of the plurality of fields to determine whether the first and second fields are to be assigned to one of the training clusters.

9. The method of claim 8, wherein the received measurements of features of the plurality of fields comprise measurements derived based on at least one selected from a length of a feature, a location of a field, a font size of a field, and an area of a field.

10. The method of claim 1, wherein the first training cluster includes the fields of the first field type but not the fields of the second type, and the second training cluster includes the fields of the second field type but not the fields of the first field type.

11. A system comprising:
  a computer processor;
  a non-transitory storage medium storing instructions executable on the computer processor to:
    generate training clusters of fields from a plurality of fields in training documents, each respective training cluster of the training clusters is associated with a respective different field type from the training documents, wherein a first training cluster of the training clusters comprises fields of a first field type from the training documents, and a second training cluster of the training clusters comprises fields of a second, different field type from the training documents;

generate first measurement information pertaining to features of fields in the training clusters;

receive annotations of the training clusters for training documents of a document type, wherein the first training cluster is annotated with a first name responsive to the first training cluster's fields being associated with the first field type, and the second training cluster is annotated with a second name responsive to the second training cluster's fields being associated with the second field type;

generate a classification model based on training information comprising the first measurement information, the classification model comprising names of the training clusters based on the received annotations; and responsive to second measurement information for features of fields associated with first and second new clusters of a new document of the document type, automatically annotate each of the first and second new clusters based on the second measurement information using the classification model, wherein the first new cluster that has fields of the first field type is annotated with the first name, and the second new cluster that has fields of the second field type is annotated with the second name.

12. The system of claim 11, wherein the generating of the training clusters is based on similarity measurements between the fields of the training documents.

13. The system of claim 12, wherein the instructions are executable on the computer processor to generate the first and second new clusters based on similarity measurements between subtrees for the fields associated with the new document, wherein the subtrees are associated with a hierarchical tree structure that represents the new document.

14. The system of claim 13, wherein each similarity measurement between subtrees is an edit distance between two of the subtrees, wherein the edit distance is a minimum number of edit operations used to transform one of the two subtrees to another one of the two subtrees.

15. The system of claim 11, wherein the instructions are executable on the computer processor to generate the first and second new clusters based on measurements of features for the fields associated with the new document.

16. A non-transitory computer readable storage medium storing instructions that upon execution cause a computer system to:

access training information that includes first measurement information pertaining to features of a plurality of fields associated with training clusters for documents of a document type, the training clusters produced from clustering the plurality of fields in the documents into respective different training clusters for respective different field types, wherein a first training cluster associated with a first field type of the different field types is annotated with a first name and comprises fields of the first field type from the documents, and a second training cluster associated with a second field type of the different field types is annotated with a second name and comprises fields of the second field type from the documents;

generate an electronic classification model based on the training information;

access second measurement information for features of fields associated with new clusters of a new document; and automatically annotate each of the new clusters based on the second measurement information using the classification model, wherein a first new cluster that has fields of the first field type is annotated with the first name, and a second new cluster that has fields of the second field type is annotated with the second name.

17. The non-transitory computer readable storage medium of claim 16, wherein the instructions upon execution cause the computer system to:

generate the new clusters based on similarity measurements between subtrees for the fields associated with the new document, wherein the subtrees are associated with a hierarchical tree structure that represents the new document.

18. The non-transitory computer readable storage medium of claim 14, wherein the similarity measurements are edit distances between pairs of the subtrees, wherein a respective edit distance of the edit distances is a minimum number of edit operations used to transform a first subtree of a respective pair of subtrees to a second subtree of the respective pair of subtrees.

19. The non-transitory computer readable storage medium of claim 16, wherein the instructions upon execution cause the computer system to:

generate the new clusters based on measurements of features for the fields associated with the new document.

20. The non-transitory computer readable storage medium of claim 16, wherein the instructions upon execution cause the computer system to:

receive similarity measurements between features of the plurality of fields in the documents of the document type; and use the similarity measurement between features of a first field of the plurality of fields and of a second field of the plurality of fields to determine whether the first and second fields are to be assigned to one of the training clusters.

* * * * *